US 6,917,671 B1

(12) United States Patent
Burg

(10) Patent No.: US 6,917,671 B1
(45) Date of Patent: Jul. 12, 2005

(54) NETWORK-BASED METHOD FOR NOTIFICATION OF THE BEST TIME TO CALL

(75) Inventor: Frederick Murray Burg, West Long Branch, NJ (US)

(73) Assignee: AT&T Corp., New York, NY (US)

( * ) Notice: Subject to any disclaimer, the term of this patent is extended or adjusted under 35 U.S.C. 154(b) by 39 days.

(21) Appl. No.: 10/086,205

(22) Filed: Oct. 25, 2001

(51) Int. Cl.⁷ .............................................. H04M 15/00
(52) U.S. Cl. ............................ 379/121.02; 379/114.02; 379/114.28
(58) Field of Search ..................... 379/114.01–114.06, 379/114.1, 114.12, 114.13, 114.21, 114.28, 111, 115.02, 121.02, 121.01, 127.05, 128, 88.13, 88.12, 88.21, 220.02; 455/405, 406, 414

(56) References Cited

U.S. PATENT DOCUMENTS

| 4,625,081 A | 11/1986 | Lotito et al. |
| 4,850,007 A | 7/1989 | Marino et al. |
| 4,932,046 A | 6/1990 | Katz et al. |
| 5,040,208 A | 8/1991 | Jolissaint |
| 5,109,404 A | 4/1992 | Katz et al. |
| 5,353,335 A | 10/1994 | D'Urso et al. |
| 5,402,472 A | 3/1995 | MeLampy et al. |
| 5,408,526 A * | 4/1995 | McFarland et al. .... 379/202.01 |
| 5,473,630 A * | 12/1995 | Penzias et al. ......... 379/114.02 |
| 5,499,287 A | 3/1996 | Campbell et al. |
| 5,515,425 A | 5/1996 | Penzias et al. |
| 5,553,121 A | 9/1996 | Martin et al. |
| 5,570,417 A * | 10/1996 | Byers ..................... 379/114.02 |
| 5,627,884 A | 5/1997 | Williams et al. |
| 5,748,718 A * | 5/1998 | Manicone .................... 379/131 |
| 5,838,779 A | 11/1998 | Fuller et al. |
| 5,907,596 A | 5/1999 | Karnowski |
| 5,930,343 A * | 7/1999 | Vasquez ................. 379/114.01 |
| 5,978,455 A * | 11/1999 | Johnson et al. ............. 379/111 |
| 6,052,449 A * | 4/2000 | Chavez, Jr. ............ 379/114.02 |
| 6,104,792 A * | 8/2000 | Lautenschlager et al. ... 379/130 |
| 6,301,471 B1 * | 10/2001 | Dahm et al. ................. 455/405 |
| 6,330,311 B1 * | 12/2001 | Mijares et al. ......... 379/112.01 |

FOREIGN PATENT DOCUMENTS

| EP | 0 426 361 A2 | 5/1991 |
| EP | 0 794 650 A2 | 9/1997 |
| EP | 0 527 855 B1 | 12/1998 |
| EP | 0 531 048 B1 | 12/1998 |
| EP | 0 626 776 B1 | 4/1999 |
| EP | 0 504 287 B1 | 7/1999 |
| EP | 0 697 780 B1 | 7/2000 |
| JP | 63267048 | 11/1988 |

* cited by examiner

Primary Examiner—Rexford Barnie
Assistant Examiner—Barry W Taylor

(57) ABSTRACT

A method for processing a telephone call within a telecommunication network for notifying a calling party while making a telephone call of a minimum cost calling plan or period for completing the telephone call. During telephone service connection invocation but before charges are billed, a subscriber is provided with a notification suggesting the telephone call would be cheaper if made on a different day or time. Also the notification may state that different calling plan would be cheaper at the time of the telephone call.

10 Claims, 4 Drawing Sheets

US 6,917,671 B1

NETWORK-BASED METHOD FOR NOTIFICATION OF THE BEST TIME TO CALL

FIELD OF THE INVENTION

The present invention generally relates to telecommunications services, more particularly to a method arid system that provides notification of calling plan information to subscribers of a telecommunications carrier.

BACKGROUND OF THE INVENTION

Telecommunication service companies provide access to local, regional, national, or international telecommunication networks for subscribers. Telecommunication service companies often create multiple access pricing plans to allow customers to use the service at their convenience, according to their different lifestyles. Wireless telecommunication service providers have different subscription service plans for local access, long distance, or toll telephone calls. In the pubic switched telecommunications network, an interexchange telecommunication service provider or carrier network generally provides telephony connections between different local exchange carrier networks and international networks. Subscribers to the interexchange network are generally enrolled in plans that may charge certain rates for service usage dependent upon various factors, including the destination the time of day or day of week, while charging different rates at other times and for other destinations. These rate structures are generally referred to as calling plans.

It is known that the calling plans are tailored for different calling time periods and calling patterns. The plans are generally based on network capacity, federal regulations for pricing and tariff rates. Nevertheless, the calling plans may include a flat rate for any call made during any workday, such as Monday through Friday, but another rate for calls made on the weekends. Another plan may have a flat rate during the day between certain hours and a different rate for another period of time. Other calling plans might have a flat rate because of regional calling patterns, such as a flat rate for calling anywhere within a predefined area of the East or West coast. These are so called regional flat rate plans. In addition, calling plans vary from a telecommunications carrier to carrier. The diversity of telecommunications services and the multiple calling plan options place subscribers in need of help. To save money, subscribers do not always choose an optimal plan for their usage patterns, nor do they always use the telephone service at the best time (e.g., cheapest) for their designated calling plan. One reason for this problem is the inability of most subscribers to analyze usage patterns or lack of knowledge as to what plan best fits their particular situation.

A subscriber has several options to determine an appropriate calling plan. One option is to directly contact a customer service office or a sales office of a telecommunications service carrier who can then analyze the bills. While helpful to the subscriber, this option does not enable the subscriber to have instant notification or knowledge via the network while initiating a telephony connection of the best calling plan or best time to call to save money. A second option is to contact a telecommunication consultant. This option can be undesirable because of the potential high costs of using a consultant.

Another option includes installing customer premises equipment (CPE) and devices to monitor usage. U.S. Pat. No. 5,748,718 to Manicone illustrates a call monitoring device installed at a customer site. In one aspect, the device purports to include rate data in an internal database. The device appears to be an accounting system for storing usage data and allowing the user to block telephone calls; limiting the number of calls per day, week, or month; and informing the user of preset spending limits. While this device might be helpful for some limited purposes, it does not provide a network-based method of informing the customer of the best calling plan or best time period to make a telephone call.

In the past, for direct-dialed calls, once a call was initiated by the subscriber, a connection in the network was established between the calling party and the called party without the calling party being notified of his/her current calling plan or which rate structure was most economical. Further, the calling party was not given an opportunity to shift the time of the call to another time during the same day or a subsequent day to save money based on the calling plan. Thus, what is needed is a method and system for advising a telecommunications subscriber of the least-cost calling plan or period in their current calling plan that solves the problems in the relevant art.

BRIEF SUMMARY OF THE INVENTION

Briefly, the present invention in one aspect includes a network-based advisement feature for providing advanced telecommunications services in toll calling. The advisement feature includes a system and method that provides a notification, during telephone service connection invocation but before toll charges are billed, as to whether a subscriber is using their calling plan at the best period or whether a different calling plan would be better for using the service at the time of the telephone call. In this manner, the telecommunications network informs the subscriber of the most economical manner of using the service consistent with their calling patterns.

In a first aspect of the invention, a method provides for processing a telephone call initiated by a calling party to a called party. In accordance with the method, a request is received for a communications connection from an originating address (e.g. a telephone number) of a calling party to a terminating address (telephone number) of the called party. Calling plan information of the originating address is retrieved from a database in the network. The database can be associated with a Service Control Point (SCP). The SCP determines a minimum cost period for completing the communications connection corresponding to the calling plan information (if any) for the originating address. Once the period is determined, a notification of the minimum cost period is transmitted to the calling party from the telecommunications network while the communications connection is being established in the telecommunications network.

In a second aspect of the invention, there is provided a method for notifying a calling party while making a telephone call of a minimum cost period for completing the call. In accordance with the method, a network address (e.g. telephone number) is received corresponding to a telephony device or telecommunications device that initiated the telephone call. Billing rate data for the network address is retrieved from a database in the network. The minimum cost period is determined for completing the telephone call based on the billing rate data for the network address during set-up of the telephone call. The calling party is notified of the minimum cost period prior to completing set-up of the telephone call.

The aspect of the present invention has several advantages singularly or have synergistic effects together for: enabling a subscriber to have information on a real-time basis of the calling plans of the predetermined interchange network. In addition, a subscriber is notified on a real-time basis of the lowest cost calling plan among service providers. Another advantage includes enabling a subscriber to make informed decisions as to efficient telecommunications services. Still other advantages include enabling a subscriber to shift and manage access of telecommunications services to lower operating costs.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
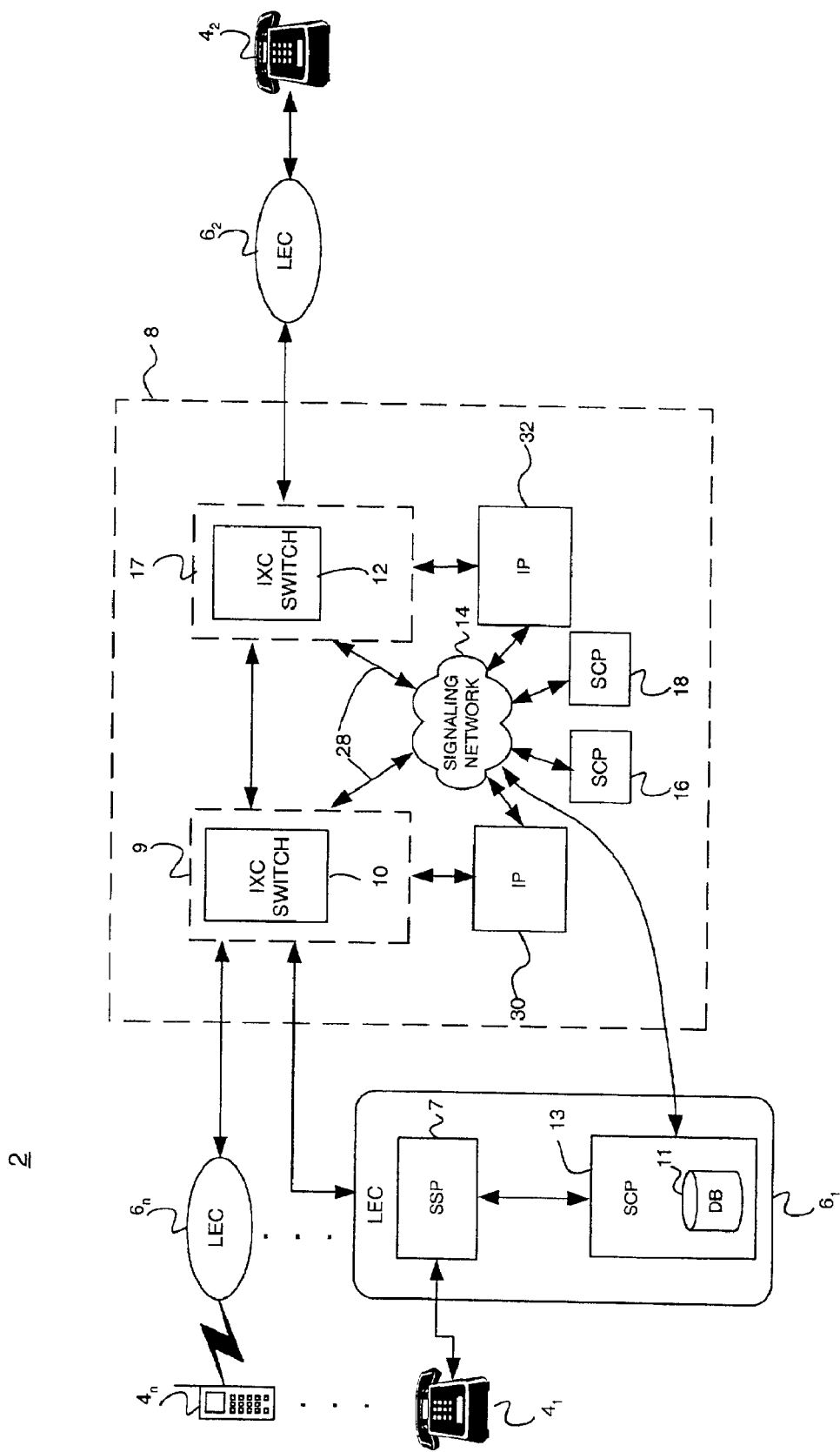
FIG. 1 is a schematic diagram of a telecommunication network environment in which an embodiment of the invention maybe implemented.

FIG. 1 illustrates a schematic diagram of a telecommunications network 2, including an Advanced Intelligent Network (AIN) for providing telephone service to one or more customers or subscribers $4_1$, $4_2$ ... $4_n$ (where n is an integer and the number of subscribers). The operation of the network 2 will be briefly described followed by a description of implementing a method and system for advising a subscriber of the least cost period or least cost calling plan to make the particular telephone call in telecommunications network 2. The network 2 may include a plurality of Local Exchange Carrier Networks (LEC's) $6_1$, $6_2$ ... $6_n$, each providing local service to one or more corresponding telephony devices including wireless phones connected to LEC $6_n$. For example, LEC $6_1$ comprises one or more Service Switching Points (SSP) 7, including local switches with associated software to process and route a plurality of telephone calls made by the subscribers. Regarding LEC $6_n$, subscriber $4_n$ for example, may make and receive calls through an individual cell site (not shown) or a succession of cell cites connected to one of a pair of Mobile Telephone Switching Offices (not shown). While FIG. 1 depicts a separate LEC for each subscriber, a single LEC may include a plurality of local switches and may serve a plurality of individual subscribers for wire-line or wireless services.

In the illustrated embodiment, subscribers $4_1$, $4_2$ ... $4_n$ receive long distance telephone service from an Inter-eXchange Carrier (IXC) network 8, such as the network maintained by AT&T Corp. The network 8 includes at least one, and typically a plurality, of interconnected toll switches, represented by the switches 10 and 12 embodied in remote Service Switching Points (SSP) 9 and 17, respectively, that are linked to at least one LEC. Although FIG. 1 depicts only the two toll switches 10 and 12 within the IXC network 8, the network may typically include a plurality of such interconnected switches. In an example, subscriber $4_1$ makes an outgoing long distance call to subscriber $4_2$. Each toll switch, such as switch 10, that is linked to a LEC, such as LEC $6_1$, routes the call received from its associated LEC to another toll switch, for example switch 12, within the network 8. The receiving toll switch (e.g., switch 12) routes the call to the destination LEC (e.g., LEC $6_2$), either directly, if the switch serves that LEC, or through one or more switches (not shown). It should be appreciated that long distance telephone services may include inter-Local Access and Transport Area (LATA) toll calls, as well as intra-LATA toll calls, as known by those of ordinary skill in the art.

Network 2 also includes a signaling network 14 that comprises a plurality of network elements. The network elements include intelligent controlling computers, such as service control points (SCP's) 16 and 18, and intelligent peripherals (IP's) 30 and 32, such as voice/Dual Tone Multi-Frequency (DTMF) processing platforms and announcement platforms. SCP 16 and 18 each include a plurality of service package applications that are used for providing advanced telecommunications services to the subscribers via the AIN. Signaling network 14 links the SSPs 9, 17 and SCPs 16, 18 for providing the advanced telecommunications services. The signaling network includes a plurality of signal transfer points (not shown) having hardware and software for transmitting call control information between the SSPs, SCPs, intelligent peripherals, or other specialized resources. It should be appreciated that the signaling network may include high bandwidth data lines 28, such as ATM lines for sending control information. The signaling network employs software such as Signal System No. 7 (SS7) signaling protocol, which is known to those of ordinary skill in the telephony art.

Figure 2:
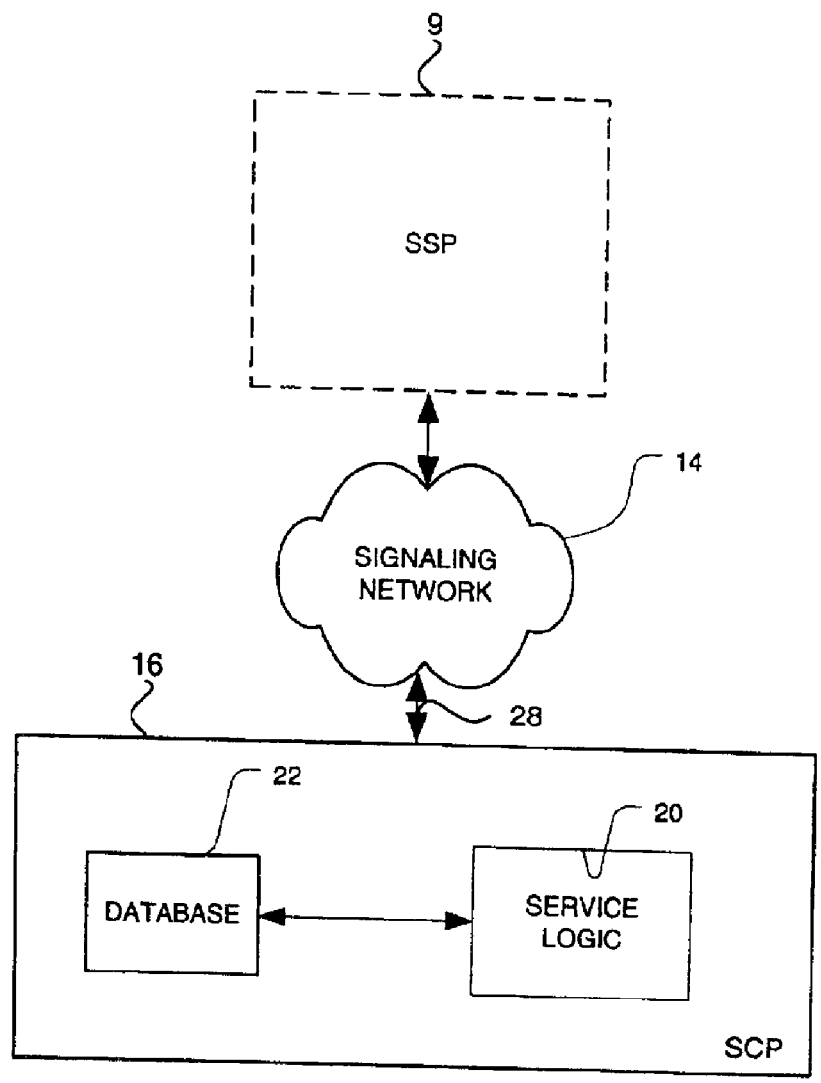
FIG. 2 is a schematic diagram of an embodiment of a call processing system shown in FIG. 1.

SCP 16 and 18 are functionally the same for originating and terminating call processing control according to an embodiment of the invention. For ease of explanation, the operation of SCP 16 will be described for telephone calls originating from LEC $6_1$ or LEC $6_n$. It should be appreciated that calls can also originate from LEC $6_2$ as well. According to an embodiment of the invention, as seen in FIG. 2, SCP 16 may include a calling plan database 22 and the service package application for least-cost advisement. Calling plan database 22 retains calling plan information of subscribers of the IXC network 8. Processing service logic 20 includes programmed instructions to obtain the calling party telephone number via automatic number identification (ANI). During the telephone call-setup period when each SSP consult an SCP, such as SCP 16, for call processing instructions, SCP 16 executes programmed instructions so that the calling party is advised or notified of the minimum cost rate plan or period for the calling party prior to a ring being generated at the called party telephony device. If desired, SCP 16 may calculate a toll charge typically determined in accordance with the designated calling plan based on several factors, including the time-of-day, the origin and destination of the call, as well as whether the call was direct-dialed, or a credit-card call.

Referring to FIG. 1, according to an embodiment of the invention, one or more intelligent peripherals (IP) 30 and 32, such as an announcement platform, are coupled through signaling network 14 to the SCP's and each is coupled to a respective one of the SSP's 9 so as to provide a voice announcement to a caller of the least cost calling plan or least cost period to make the call. Accordingly, IP 30 may be actuated by SCP 16 with a play announcement instruction via signaling network 14 to produce or otherwise provide the desired voice announcement. One of ordinary skill in the telephony art should recognize that once the IP has received a command to make the desired voice announcement, it may have a logical connection through the associated IXC switch and LEC switch such that a temporary bearer channel is established. After the announcement is completed, the bearer channel may be released.

Figure 3:
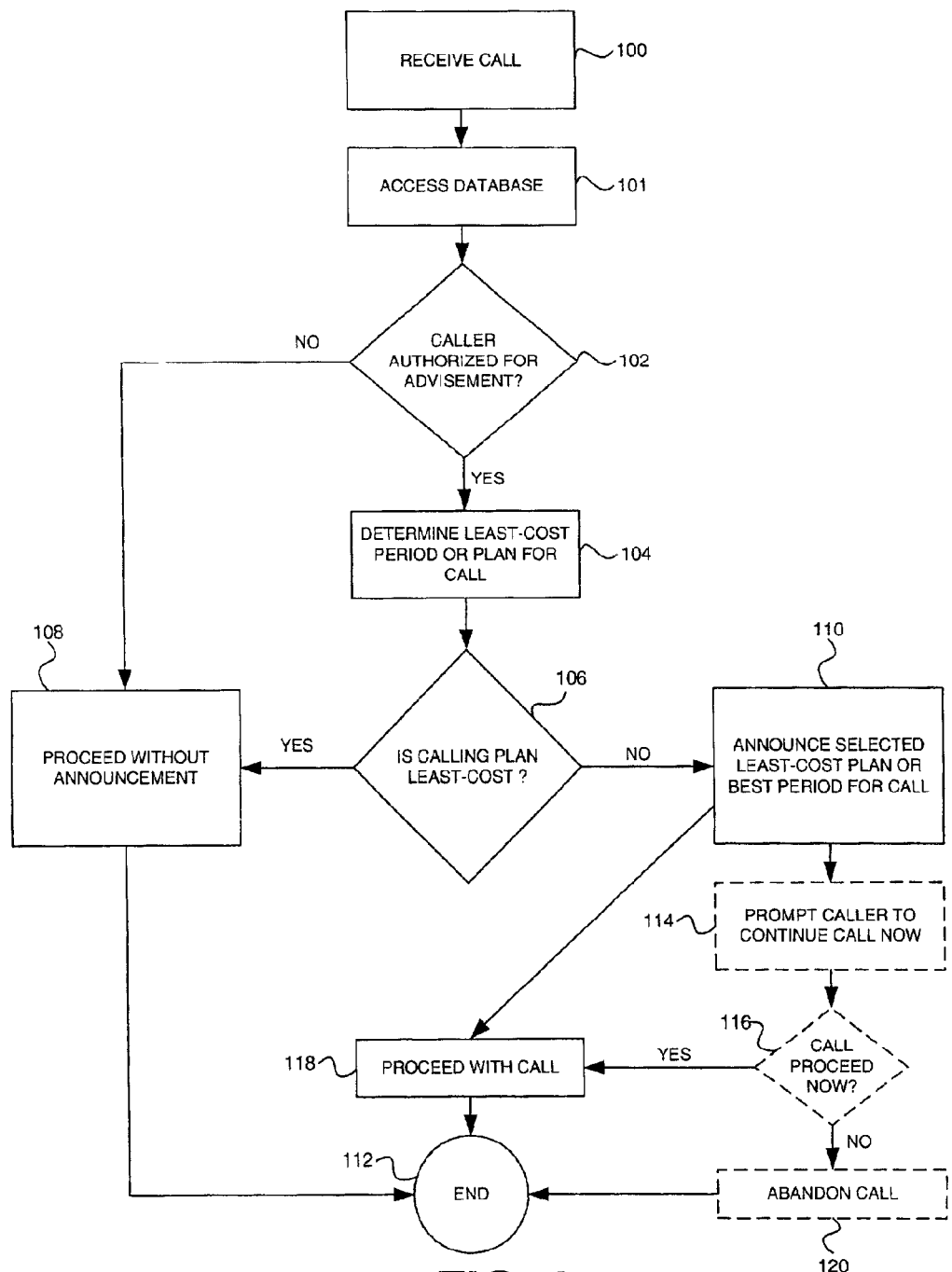
FIG. 3 is a flow diagram illustrating an embodiment of processing a telephone call within the network shown in FIG.1 and system shown in FIG. 2.

FIG. 3 illustrates a network-based approach to advising or notifying a subscriber of the minimum cost period or the least cost/minimum cost calling plan to complete the particular telephone call while the subscriber is making a telephone call. The illustrated approach may be implemented in a service application package controlled by a designated service control point within the intelligent network. In one approach, call processing control is effectuated in a serial processing manner, in which specific network activities are substantially completed before another activity starts. In this manner, substantially all activities of the advisement feature are performed before a call is routed to the called party. There might be a slight time delay period in the serial approach. An embodiment of the present invention can also be implemented in a parallel processing manner, in which call processing for the advisement feature is performed at the same time as the telephone call is routed to the called party. Thus, the parallel approach enables the network to provide the advisement feature during the progression of the call-setup, but not delaying connection to the called party.

With continued reference to FIG. 3, by way of example, at block 100, a subscriber, such as subscriber $4_1$, places a long distance telephone call from LEC $6_1$ through telecommunications network 2 to another subscriber, such as subscriber $4_2$, that is connected to LEC $6_2$. In this situation, subscriber $4_1$ is the calling party originating the telephone call from an originating network address. During the call-setup period for routing the call to the telecommunications device of subscriber $4_2$, SSP 9 having IXC switch 10 in IXC network 8 receives the telephone call. Upon receipt of the call, SSP 9 may verify if subscriber $4_1$ has registered or is authorized to receive advanced telecommunication service provided by IXC network 8 for advising of the least-cost period or least/minimum cost calling plan for the telephone call. The verification can be accomplished in a number of ways.

In one approach, SSP 9 may launch a request via signaling network 14 to SCP 16 to determine what special predetermined handling is associated with the call. SCP 16 receives the query about the call at step 100 of FIG. 3, including parameters about the calling party $4_1$, such as the Automatic Number Identification (ANI). SCP 16, having the service application package of the present invention, may consult database 22 for a customer record at block 101 to determine whether the caller $4_1$, is to receive the network-based advisement feature. This network advisement feature includes the instructions for processing the telephone call. If the subscriber is indeed authorized, as determined at block 102, then further action is first taken in accordance with the illustrated embodiment. If the subscriber is not authorized or not registered, then SCP 16 ends the processing for the network-based advisement feature and immediately provides routing instructions for proceeding with the call at block 108 in a known manner to LEC $6_2$.

With continued reference to FIG. 3, given that the subscriber is authorized to receive the advisement feature per block 102, the call parameters are used for further processing. The call parameters may include the current time of day, the day of the week, the originating telephone number, the terminating telephone number, and/or associated routing information. Because the call has specialized handling, SCP 16 may access other databases in the AIN network for the available calling plans being used in IXC network 8 for the particular class of subscriber. Purely by way of example, a residential subscriber class would have the particular call parameters for residential calling plans as opposed to business calling plans of a business subscriber class. In addition, the current calling plan of the account of the telecommunications device that initiated the call is retrieved. The account information includes billing rate data and information associated with the calling plan.

At block 104, the call parameters of the subscriber's call are compared to the available calling plans retrieved in block 101. It should be appreciated that the call parameters can be obtained by prompting a subscriber for input or by receiving the parameters from an SSP. The preferred function of the comparison is that SCP 16 or other SCPs in the network determine the minimum cost period to complete the telephone call based on the available information by minimizing the cost of the billed call for the subscriber. The comparison for the telephone call can be made by a number of approaches. A default or predetermined length of time may be used as a basis of comparison for the lowest cost period. The predetermined time may be based on a national average for a long distance phone call. Alternatively, the predetermined length of the time may be based on the previous call history of the subscriber in which an average time can be calculated by processing service logic 20. If desired, the SCP may prompt the caller to estimate the predetermined length of the call.

With continued reference to block 104, the least-cost calling plan, the cheapest time of day, the cheapest times of day, or day(s) of week to make the call are determined on a telecommunications billing unit basis for the particular telephone call in the particular IXC carrier network. One can appreciate that a telecommunications billing unit can be any appropriate billing convention established in a monetary denomination per unit of time, such as cents per minute, cents per message unit, or cents per a predetermined amount of usage of service. For example, regarding the cheapest day approach, the subscriber's calling plan may have two flat rates—a first rate for Monday through Friday and a second rate for Saturday through Sunday. The first rate may have a higher telecommunications billing unit cost (cents per minute basis) than the second rate. Accordingly, the day of the week of the particular call is compared to when the first rate and the second rate are available during the week. Other approaches could be based on lowest cost to account for the switching, transfer, and/or tariff costs associated with telephone call to the terminating telephone number. One of ordinary skill in art would understand that numerous implementations of the least-cost approach are possible based on the disclosure.

At block 106, a decision is made as to whether the current calling plan of the subscriber is the least, minimum, or lowest cost for the particular call. If the current calling plan of the subscriber is the lowest cost for the particular call, then at block 108, the call is routed through IXC network 8 and to the LEC associated with the terminating telephone number or terminating network address. In this block, while an announcement is generally not provided, intelligent peripheral 30 may be signaled to announce that the subscriber's current plan is the cheapest or the subscriber is using the current plan consistent with receiving the cheapest cost. This arrangement informs the subscriber that the selected calling plan is working to save money.

Based on the results of block 106, it may be determined that the subscriber's current calling plan is not the lowest cost for the particular call or the current plan is not being used to make the particular call the cheapest for the given day of the week or given time. In such cases, system flow proceeds to block 110. At block 110, intelligent peripheral 30 may notify subscriber $4_1$ by making an announcement of the best period or least-cost calling plan for the particular call. There are a number of forms for the announcement. It should be appreciated that the form of the announcement depends on the results of the analysis in block 104. By way of example, if the time of day needs to be adjusted to save money, then the announcement would provide a range of times where the call is cheapest to the subscriber. Likewise, if the day of the week needs to be adjusted, then the announcement provides the day or ranges of days where the call will be the cheapest to the subscriber. If another calling plan is better, then the announcement provides the better calling plan, such as the name of the plan and the associated rates. After the announcement is made per block 110, the call proceeds per block 118. At block 112, the processing of the network advisement feature ends.

In alternative embodiments, the network can provide other specific announcements and optional call processing actions. For example, IP 30 or IP 32 may alternatively prompt the caller $4_1$ if they want to proceed with the current call now or wish to abandon the current call so that it may be made at the better time, as shown in block 114 of FIG. 3. After the prompting in block 114, if the call is to proceed per block 116, then the call routing proceeds at block 118, through the IXC network 8 to the responsible LEC, such as LEC $6_2$, in which the call is connected. At block 120, if the call is not to proceed, then it is abandoned. Alternatively, in block 120, after the announcement is played to subscriber $4_1$, IP 30 may prompt subscriber $4_1$ to determine if they desire the call to be transferred to a customer service office or operation of the carrier of IXC network 8 or other entity. In this case, the subscriber is afforded an opportunity to change calling plans or discuss the current calling plan. At block 112, the processing of the network advisement feature ends.

In alternative embodiments, within IXC network 8, the results of the analysis in blocks 104, 106, and 110 can be stored in a separate database or database 22 for processing by a customer service operation of the IXC carrier or other entity. In such a case, the stored data may be processed and reports can be provided to the subscriber. The reports may be displayed on the World-Wide Web (WWW) page on the Internet or a copy may be provided to the subscriber via postal mail or electronic mail. In an alternative embodiment, the advisement feature may be temporarily stopped or deactivated by the subscriber as desired. In several approaches, the advisement feature of network 8 can remain active until the subscriber re-calls the system to deactivate the advisement feature; the advisement feature may deactivate after a determined period of time, after a predetermined number of calls, or if the subscriber calls the same telephone number within a predetermined period of time, such as in the same day. Further, the advisement feature may be activated on a random basis so that the subscriber has a periodic check on the calling plans for the assigned telephone number.

It is also recognized that a single subscriber, such as $4_1$, may make many calls at different times to different destinations. In some cases, one calling plan best meets the needs of a subscriber for the lowest cost, while in other cases another calling plan may be lower. It is also contemplated that the advisement feature may provide a capability to store the best calling plan information over a period of time for each call. The above-mentioned web page or mail implementation may include a listing of this accumulated information, thus allowing the subscriber to select the calling plan that provides the best overall value for his/her calling habits. The listing may also show the cost as if all calls were made with each of the identified plans and the actual cost incurred for the calls. If desired, the listing can be incorporated with bills sent to subscribers.

It is also contemplated that the method and apparatus shown in FIGS. 1–3 may be implemented by a call being received by an originating LEC, but prior to routing to an IXC network. Turning to FIG. 1, the LEC, such as LEC $6_1$ includes one or more local SSP's for providing service to a subscriber, such as subscriber $4_1$. In an embodiment, the local SCPs 13 are enabled to provide the best period or least cost calling plan for the particular call for intra- or inter-Local Access and Transport Area (LATA) long distance toll calls for a plurality of IXC carriers in network 2 or the LEC. The calling plans may be stored in a database 11. This arrangement provides the subscriber with the ability to determine on a real-time basis, among the various long distance calling plans of the IXC carriers or the LEC, the cheapest plan by having an audible notification or advisement via the network. It should be understood that the LEC is providing information as to the minimum cost calling plan and the call is routed to the pre-selected IXC network of the subscriber by the LEC, until the subscriber changes their current IXC network service provider or carrier. If desired, the LEC may differentiate between the various IXC network carriers by a primary interexchange carrier value or PIC. U.S. Pat. No. 5,333,184 to Doherty et al., which is herein incorporated fully by reference, describes the primary interexchange carrier functions. If desired, PIC values may be stored in database 11 as well.

Figure 4:
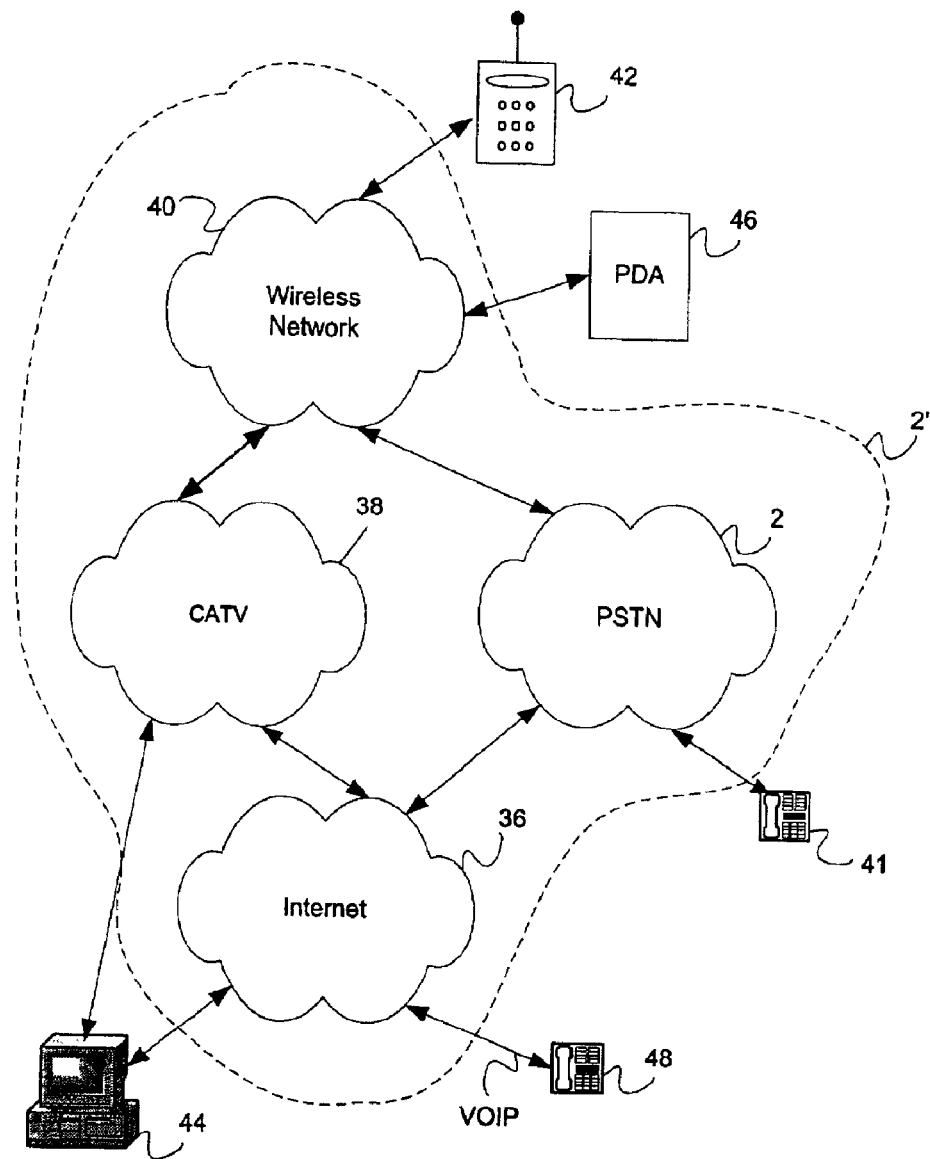
FIG. 4 is a schematic diagram of an alternative network environment for implementing the present invention.

Referring to FIG. 4, it is to be understood that the embodiments of the invention can be applied to many types of telecommunications systems and networks environments 2' which can include a plurality of differing networks, for example, a local, national, international telecommunications Public Switched Telephone Network (PSTN) network 2, Internet 36, a CATV network 38 providing telephony, a wireless/satellite telecommunications network 40, including cellular, or Personal Communication Services (PCS) networks or other suitable networks. A wireless network may have a host of services such as text messaging for wireless phones or other services such as the Wireless Application Protocol (WAP) for operating devices in a Wireless Application Environment (WAE). It will be appreciated that the network connections shown are exemplary and other methods or ways of establishing a communications links may be used. It should be appreciated that subscribers to the advisement feature may use an appropriate telecommunication device that provides telephony, such as a wire-line telephone 41, a wireless telephony device 42, a personal computer 44, a laptop with a voice modem (not shown), a telephony-enabled personal digital assistant 46, an IP-enabled telephone 48, or a palm-sized computer (not shown).

With continued reference to FIG. 4, in other embodiments, video telephone systems are also contemplated, such as systems operating over broadband CATV networks 38, including coaxial or fiber optics networks in which a video message may be provided to the subscriber making the call. In this embodiment, a notification in the form of the video message can be provided by the network to the video telephone device of the subscriber. In a further embodiment, wireless phone 42 that has a display screen enabled to receive wireless messages from the network can have a text message or text notification transmitted to the phone via the network. The wireless phone may also include software such as Wireless Application Protocol for wireless World Wide Web access to display a message on the phone. Further, in a Voice over Internet Protocol (VoIP) environment in connection with IP-enabled telephone 48, a softswitch, a software call agent, or media gateway controller (not shown) can provide the call control similar to the SCPs. Accordingly, the call agent may provide the functionality for implementing an advisement feature for advising or notifying a subscriber of the minimum cost period or the least cost/minimum cost calling plan to complete the particular telephone call while the subscriber is making a telephone call.

Alternatively, an embodiment of the present invention can be implemented in a switched data packet network that provides end-to-end voice-over-packet telephony, similar to VoIP. It should be appreciated that the calling plans and time periods in specific calling plans may also relate to predetermined quality of service levels (QoS). For example, a packet network provider may have differently priced plans for the quality of service levels by blending network factors, such as peak loading and congestion related to delay in an end-to-end voice-over-packet call, and jitter. In operation, while the subscriber is making a call, the subscriber can be advised by the network of another time that may be best to call based on the network loading or cost considerations. A call controller (not shown) can provide the functionally for processing the telephony call and notifying the subscriber. It is also recognized that the advisement need not be limited to just telephone calls. An embodiment of the invention can also be applied to an environment where charges are incurred for use of resources on a consumption-basis as opposed to a flat-rate charge over a period, such as a month.

Thus, a network-based advisement feature for providing advanced telecommunications services has been described. The advisement feature includes a system and method. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Different hardware may be used than that shown and suggested that may comprise hardware, firmware, or software implementations of the present invention. Therefore, it is intended that the invention not be limited to the particular embodiments disclosed, but that the invention include all embodiments falling within the scope of the appended claims. All United States patents or patent applications cited herein should be deemed to be incorporated by reference as to their entire contents.

What is claimed is:

1. In a telecommunications network, a method for providing a network-based notification service to a calling party during processing of a telephone call of the calling party to a called party, comprising the step of:
   storing in a database in the telecommunications network calling plan information for subscribers including calling plan information associated with the originating address of the calling party;
   receiving a request for a communications connection from an originating address of the calling party to a terminating address of the called party;
   verifying that the originating address of the calling party is to receive the notification service for the received request;
   retrieving the stored calling plan information associated with the originating address of the calling party;
   determining a minimum cost period which is al least one of a time of day, a day of a week, and a plurality of days for completing the communications connection based on the calling plan information for the originating address;
   while the communications connection is being established within the telecommunications network and before completing the connection of the calling party an the called party transmitting from the telecommunications network to the calling party an audible notification message including the minimum cost period to the calling party from the telecommunications network;
   prompting the calling party to abandon the telephone call after transmitting the minimum cost period;
   completing the connection of the calling party to the called party if the telephone call is not abandoned by the calling party; and
   deactivating the transmission of the notification message after receiving a deactivation request.

2. The method of claim 1, further comprising the step of prompting the calling party for transfer to a customer service center.

3. The method of claim 1, wherein the step of transmitting further comprises the step of displaying the notification message on a display screen.

4. The method of claim 1, further comprising the step of displaying the minimum cost period on a web page.

5. The method of claim 1, further comprising the step of deactivating the transmission of the notification message after a predetermined period of time.

6. The method of claim 1, further comprising the step of providing a plurality of minimum cost periods to the calling party, after the calling party has made a plurality of telephone calls.

7. A method within a telecommunication network of providing a service for notifying a calling party of a minimum cost period for completing a telephone call, wherein the minimum cost period is at least one of a time of day, a day of week, and a plurality of sequential days, comprising the steps of:
   storing in a database in the telecommunications network billing rate data associated with the network address of the calling party;
   receiving a network address corresponding to a telecommunications device that initiated the telephone call;
   verifying that the network address of the telecommunications device is to be notified of the minimum cost period;
   receiving billing rate data for the network address from the network database;
   determining the minimum cost period for completing the telephone call based on the billing rate data for the network address during set-up of the telephone call;
   notifying the calling party of the minimum cost period by audibly announcing the minimum cost period and the ability to terminate the call prior to completing set-up of the telephone call; and
   deactivating the step of notifying the party after receiving a deactivation request.

8. The method of claim 7, further comprising the step of prompting the calling party for transfer to a customer service center.

9. The method of claim 7, wherein the step of notifying further comprises the step of displaying the minimum cost period on a display screen.

10. The method of claim 7, further comprising the step of displaying the minimum cost period on a web page.

* * * * *